3,462,485
PROCESS FOR THE PREPARATION OF l- AND d-CARNITINE CHLORIDES
Fernand Binon, Herbert Ziegler, and Claude Marr, Brussels, Belgium, assignors to Societe Belge de l'Azote et des Produits Chimiques du Marly, Societe Anonyme, Liege, Belgium
No Drawing. Filed Mar. 7, 1966, Ser. No. 532,117
Claims priority, application Belgium, Mar. 12, 1965, 661,015
Int. Cl. C07c *101/10, 99/00, 103/10*
U.S. Cl. 260—534                               3 Claims

ABSTRACT OF THE DISCLOSURE

A method of producing l- and d-carnitine chlorides by converting l- and d-carnitinamide chlorides to the corresponding desired carnitine chlorides by hydrolyzing the starting amides in hot aqueous oxalic acid.

---

The present invention relates to a new process for preparing d,l-, l- and d-carnitine chlorides corresponding to the formula:

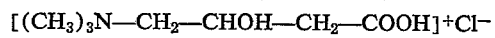

considered in its racemic, levogyrous and dextrogyrous forms.

The products defined by the above formula are prepared, in accordance with the process of the invention, from d, l-, l- and d-carnitinamide chlorides.

It is known that d,l-carnitinamide chloride may be obtained by reacting hydrogen peroxide in ammonium hydroxide with d,l-carnitine nitrile.

d,l-, and l- and d-carnitinamide chlorides can also be prepared by subjecting the appropriate carnitine nitrile chloride to the action of hydrochloric acid at a temperature of about 15° C. to about 55° C. according to the duration of the reaction which may range from about 60 hours at the lower temperature level to about 10 hours at the higher temperature level, after which the amide is separated from the reaction medium in the form of crystals by such known processes as, for example, cooling the solution to a temperature lower than or equal to 0° C., adding an alcohol, such as isopropanol, and filtering and drying the crystals of d,l-, l- or d-carnitinamide chloride which precipitate.

It is also possible to obtain l- and d-carnitinamide chlorides by separating the chloride of d,1-carnitimamide into its optically active isomers through the medium of a salt of an optically active acid, such as, for example, d-camphoric acid.

In accordance with the new process according to the invention, d,l-, l- or d-carnitinamide chloride is converted to the corresponding carnitine chloride either by hydrolysis of the starting amide by means of hot aqueous oxalic acid or by diazotation of the starting amide by means, for example, of an alkyl nitrite, such as n-butyl nitrite, in a glacial acetic acid medium, and preferably in the presence of gaseous hydrochloric acid.

The chlorides of d,l-carnitine and of l-carnitine prepared in accordance with the process of the invention possess useful therapeutic properties in that they enable a better employment by the tissues of the lipids in cases of metabolic imbalance and, in particular, denutrition syndromes of various origins, pre-and post-operative, post-infectious and post-traumatic syndromes, hypotropy, senescence, convalescence, cachexia and burns.

The practical utility of d-carnitine chloride lies in the fact that it constitutes a starting product from which d,l-carnitine chloride may be prepared.

There are already in existence several methods of preparing the chlorides of d,l-, l- and d-carnitine, but none of these known processes presents the advantages offered by the process according to the invention.

For example, d,l-carnitine chloride may be prepared through the direct hydrolysis of the chloride of d,l-carnitine nitrile by hot hydrochloric acid. However, the process according to the invention enables a d,l-carnitine chloride to be obtained which has a higher degree of purity than that resulting from the process described above. In this respect, analysis by electrophoresis of the product obtained by the process of the invention shows a degree of purity equal to or higher than 99.9%. Furthermore, the process according to the invention eliminates the danger of crotonisation inherent in the process based upon the hydrolysis of the nitrile by hot hydrochloric acid.

With regard more particularly to l- and d-carnitine, the new process according to the invention constitutes an appreciable advance in the chemical, economic and technological spheres as compared with the methods known so far.

For example, the value of the process of preparing l- and d-carnitine from l- or d-4-benzoylamino-3-hydroxybutyric acid, on an industrial scale, is appreciably diminished by the number of operations required. Similarly, the preparation of l- and d-carnitine by separation of d,l-carnitine into its optically active isomers has been found to present considerable difficulty. Furthermore, in the process which comprises the preparation of l- and d-carnitine from the corresponding carnitine nitrile, in which the latter is converted to an ester, it is difficult to maintain the optical configuration of the substances involved when the operation of hydrolizing the ester is carried out to completion. Similarly, when the process involving hydrolysis of l- or d-carnitine nitrile by means of hot hydrochloric acid is employed, it is also difficult to avoid racemization.

The new process according to the invention may be described in general terms as follows:

According to one aspect of the invention involving oxalic hydrolysis, the chloride of d,l-, l- or d-carnitinamide is heated under reflux in an aqueous solution containing from 1 to 4 moles of oxalic acid per mole of amide over a period of from about 1 to about 10 hours according to the concentration of oxalic acid employed, which concentration may range from about 70% for a reaction period of about 1 hour to about 25% for a reaction period of about 10 hours. After the solution is cooled, the oxalic acid, and the ammonium oxalate which forms, are eliminated and the solution containing the chloride of d,l-, of l- or of d-carnitine, according to the starting product employed, is evaporated under vacuum. The residue is taken up in alcohol, preferably isopropanol, and by cooling the solution so obtained to about 0° C., the crystals of carnitine chloride precipitate either in racemic or optically active form according to the nature of the starting amide. The crystals are then separated out of the reaction medium by known means.

According to another aspect of the invention based upon diazotation, a mixture is prepared containing a chloride of d,l-, l- or d-carnitinamide, an alkyl nitrite, preferably n-butyl nitrite and glacial acetic acid. To the mixture thus formed, hydrochloric acid gas may also be added. The mixture is heated for about 20 hours after which the resultant solution which contains the appropriate chloride of carnitine is cooled to about 10° C.

When the starting product is d,l-carnitinamide chloride, d,-l-carnitine chloride is immediately obtained in the form of crystals which are separated out of the reaction medium by known methods.

When the starting product is optically active, it is necessary first to add to the cooled solution a non-polar precipitation agent, such as a lower dialkyl ether, a petroleum ether or benzene, in order to precipitate the chloride of l- or d-carnitine. The precipitate so obtained is in oily form and is taken up, after decantation of the supernatent acetic solution, in an alcohol, preferably isopropanol, in order to obtain the required chloride of l- or d-carnitine in crystal form.

The examples given hereunder provide non-limitative illustrations of the processes of the invention.

Example 1

3.93 g. of d,l-carnitinamide chloride (0.02 mol.) were dissolved in 24 ml. of water in the presence of 8.6 g. of crystallized oxalic acid (0.068 mol.). The solution was heated under reflux for 6 hours. After cooling to about 0° C. for at least 6 hours, the greater part of the oxalic acid and the ammonium oxalate was filtered off and washed twice with 24 ml. of iced water. The filtrate and the water used for washing were mixed together and concentrated under vacuum until complete dryness. To the oily residue were added 40 ml. of isopropanol. After crystallization at room temperature, the mixture was maintained at a temperature of between —5° C. to 0° C. for at least 5 hours in order to ensure complete precipitation of crystals of d,l-carnitine chloride. The crystals of d,l-carnitine chloride were then filtered out. The resulting product had a melting point of 196° C.

To eliminate any traces of d,l-carnitine oxalate which may be present, the product obtained may be recrystallized in acetic acid, in the proportion of 1 g. of d,l-carnitine chloride to 1.3 ml. of acetic acid, and in the presence of a slight quantity of hydrochloric acid gas.

Example 2

A mixture comprising 1.97 g. of d,l-carnitinamide chloride (0.01 mol.). 5.05 g. of n-butyl nitrite (0.049 mol.), 1.65 ml. of a solution of hydrochloric acid gas in ether (0.01 mol.) and 20 ml. of acetic acid was heated to about 50° C. over a period of 22 hours while stirring. After the solution was cooled to about 10° C., the chloride of d,l-carnitine precipitated in the form of crystals which were separated out of the reaction medium by filtration. The resulting product had a melting point of 196° C.

Example 3

11.7 g. of l-carnitinamide chloride (0.0596 mol.) were dissolved in a mixture of 24 ml. of water and 25.5 g. of crystallized oxalic acid (0.2 mol.). The solution was heated under reflux for six hours, after which it was cooled to about 0° C. for at least 6 hours. The oxalic acid and ammonium oxalate which crystallized were filtered off and then washed twice with 15 ml. of iced water. The filtrate was concentrated under reduced pressure and the oily residue dissolved in 117 ml. of isopropanol. After filtration to remove any small quantities of insoluble matter which may be present, the solution was placed in a refrigerator at a temperature of about 0° C.

After at least 5 hours in the refrigerator, the crystals of l-carnitine chloride which formed were filtered out, washed with ether and dried under reduced pressure at a temperature not exceeding 50° C. The resulting crystals had the following properties:

M.P.=1420° C.

$[\alpha]_D = -23.8°$ (tolerance limits: 0.2°), (concentration =10%, water).

The chloride of d-carnitine was obtained from d-carnitinamide chloride by exactly the same method as that described above. Its properties are:

M.P.=142° C.

$[\alpha]_D = +23.8°$ (tolerance limits: 0.2°) (concentration =10%, water).

Example 4

A mixture comprising 1.97 g. of l-carnitinamide chloride (0.01 mol.), 5.05 g. of n-butyl nitrite (0.049 mol.), 1.65 ml. of a solution of hydrochloric acid gas in ether (0.01 mol.) and 20 ml. of glacial acetic acid was heated for 22 hours at 50° C. while stirring. After the solution was cooled to about 10° C., the l-carnitine chloride which formed was precipitated by adding ether. The supernatant solution was decanted and the oily l-carnitine chloride was redissolved in isopropanol. The solution was filtered and cooled to between —5° C. and 0° C. for several hours. Crude l-carnitine chloride was filtered out. It had a melting point of 135 to 136° C.

After recrystallization in methanol and acetone, the product melted at 136 to 139° C.

$[\alpha]_D = -22.0°$ (tolerance limits: 0.3°) (concentration =10% water).

The chloride of d-carnitine was obtained from d-carnitinamide chloride by exactly the same method as that described above. Its M.P. was 136 to 139° C.

$[\alpha]_D = +22.0$ (tolerance limits: 0.3°) (concentration =10%, water).

It may be added that the d,l-, l- and d-carnitine chlorides obtained by diazotation do not possess the same degree of purity as those obtained by hydrolysis with oxalic acid, but are nevertheless purer than the same substances obtained by the processes known up to present.

What is claimed is:

1. A method of producing l- and d-carnitine chlorides corresponding to the formula:

$$[(CH_3)_3N-CH_2-CHOH-CH_2-COOH]^+ \; Cl^-$$

considered in its levogyrous and dextrogyrous forms, said method comprising heating under reflux a substance selected from the group consisting of the chlorides of l- and d-carnitinamide in an aqueous solution of oxalic acid for a period of about one to about ten hours according to the concentration of oxalic acid employed, cooling the solution separating out the oxalic acid and the ammonium oxalate which forms, evaporating the solution under vacuum, taking up the residue in an alcohol, precipitating the crystals of the corresponding carnitine chloride by cooling the solution to a temperature of about 0° C., and separating out from the thus cooled solution the crystals so obtained.

2. A method as claimed in claim 1, wherein the aqueous solution of oxalic acid contains 1 to 4 moles of oxalic acid per mole of starting amide and the period of heating under reflux ranges from about one hour for a concentration of about 70% of oxalic acid to about ten hours for a concentration of about 25% of oxalic acid.

3. A method as claimed in claim 1, wherein the alcohol employed is isopropanol.

References Cited

UNITED STATES PATENTS 2,389,097   11/1945   Warnat _____ 260—534
3,096,368   7/1963    Binon et al. _____ 260—534
3,135,788   6/1964    Noguchi et al. ____ 260—534 XR

OTHER REFERENCES

Oka et al., Chem. Ab. vol. 60: 12,097–12,098 (1964).
Roe et al., J. Am. Chem. Soc., vol. 71, pp. 2215–2218 (1949).
Sperger et al., J. Am. Chem. Soc., vol. 70, pp. 3091–3094 (1948).

LORRAINE A. WEINBERGER, Primary Examiner

A. P. HALLUIN, Assistant Examiner

U.S. Cl. X.R.

260—561